United States Patent
Diazzi et al.

(10) Patent No.: US 12,025,445 B2
(45) Date of Patent: Jul. 2, 2024

(54) SENSOR SYSTEM, METHOD FOR OPERATING A SENSOR SYSTEM

(71) Applicant: Robert Bosch GmbH, Stuttgart (DE)

(72) Inventors: Francesco Diazzi, Munich (DE); Ruslan Khalilyulin, Munich (DE); Andrea Visconti, Munich (DE)

(73) Assignee: ROBERT BOSCH GMBH, Stuttgart (DE)

(*) Notice: Subject to any disclaimer, the term of this patent is extended or adjusted under 35 U.S.C. 154(b) by 355 days.

(21) Appl. No.: 17/445,980

(22) Filed: Aug. 26, 2021

(65) Prior Publication Data

US 2022/0074746 A1 Mar. 10, 2022

(30) Foreign Application Priority Data

Sep. 9, 2020 (DE) .................. 102020211307.6

(51) Int. Cl.
 *G01C 19/5776* (2012.01)
(52) U.S. Cl.
 CPC .................. *G01C 19/5776* (2013.01)
(58) Field of Classification Search
 CPC .................................... G01C 19/5776
 See application file for complete search history.

(56) References Cited

U.S. PATENT DOCUMENTS

| 10,393,552 | B1* | 8/2019 | Cazzaniga | G01D 3/02 |
| 2017/0016723 | A1* | 1/2017 | Shaeffer | H03L 7/099 |
| 2018/0066961 | A1* | 3/2018 | Trusov | G01C 25/005 |
| 2019/0137272 | A1* | 5/2019 | Visconti | G01C 19/5776 |
| 2019/0145773 | A1* | 5/2019 | Collin | G01C 19/5776 73/504.12 |

FOREIGN PATENT DOCUMENTS

| DE | 102016207887 A1 | 11/2017 |
| DE | 102017130384 A1 | 6/2018 |
| DE | 102017216007 A1 | 3/2019 |

* cited by examiner

*Primary Examiner* — Catherine T. Rastovski
*Assistant Examiner* — Yossef Korang-Beheshti
(74) *Attorney, Agent, or Firm* — NORTON ROSE FULBRIGHT US LLP; Gerard A. Messina

(57) ABSTRACT

A sensor system having a MEMS gyroscope. The sensor system includes a seismic mass for acquiring a measuring signal, a drive circuit, an acquisition circuit for reading out and demodulating the measuring signal, whereby a rate of rotation signal and a quadrature signal phase-shifted relative to the rate of rotation signal is generated, and a digital processing circuit for compensating an offset of the digitized rate of rotation signal using the digitized quadrature signal. The acquisition circuit and the digital processing circuit encompass a rate of rotation circuit, and a quadrature circuit for generating and processing the quadrature signal and generating a compensation signal for the offset compensation of the digitized rate of rotation signal. At least part of the quadrature circuit is operable in at least one other operating mode than the rate of rotation circuit, independently of the operating mode of the rate of rotation circuit.

10 Claims, 1 Drawing Sheet

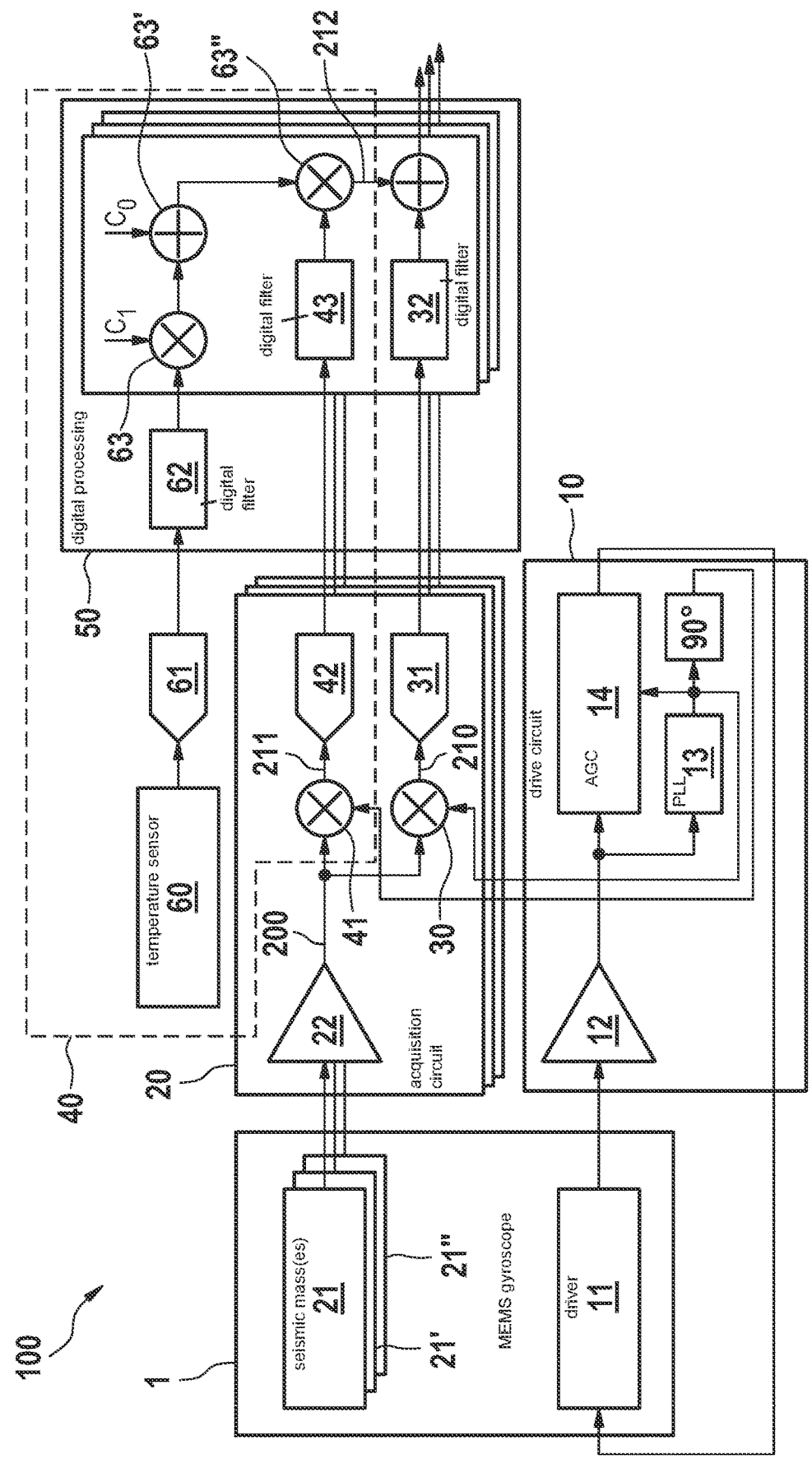

SENSOR SYSTEM, METHOD FOR OPERATING A SENSOR SYSTEM

CROSS REFERENCE

The present application claims the benefit under 35 U.S.C. § 119 of German Patent Application No. DE 102020211307.6 filed on Sep. 9, 2020, which is expressly incorporated herein by reference in its entirety.

FIELD

The present invention relates to a sensor system.

BACKGROUND INFORMATION

Gyroscopes for measuring rates of rotation are generally available and, for instance, are used as micro-electromechanical systems (MEMS) in a wide variety of devices and applications.

In practice, the current or energy consumption of a sensor is a decisive parameter of such sensors, for example in the field of consumer electronics.

Although it was already possible in the past to reduce the current consumption of an active gyroscope, there is a need for further savings in a wide variety of applications such for portable devices and IoT devices.

However, the wish to reduce the power consumption generally clashes with the goal of improving the signal quality of the output sensor signal. Therefore, the power optimization often requires careful balancing in order to realize both current-saving sensor systems and the most precise and low-noise rate of rotation measurements.

SUMMARY

It is an object of the present invention to provide a current-saving sensor system including a MEMS gyroscope by which a measurement of the rate of rotation with a relatively high signal quality is preferably able to be realized nevertheless.

In comparison with the related art, the sensor system in accordance with an example embodiment of the present invention has the advantage that at least part of the quadrature circuit means (i.e., quadrature circuit) is operable in at least one other operating mode than the rate of rotation circuit means (i.e., rate of rotation circuit), regardless of the operating mode of the rate of rotation circuit means. Thus, the quadrature circuit means are preferably at least partly able to be operated in an operating mode in which the quadrature circuit means have a lower power consumption than they would have in an operation in the operating mode of the rate of rotation circuit means. This allows for an individual reduction of the current consumption in a multitude of situations yet still makes it possible to output a rate of rotation signal of a relatively high quality. An especially individualized adaptation to specific requirements to be satisfied by a sensor system in a specific application is possible as a result.

In gyroscope systems, the quadrature signal of the gyroscope, often in conjunction with temperature information, is typically used for correcting an offset drift of the rate of rotation signal. However, the use of simple duty-cycle techniques in gyroscopes is limited by the desired signal quality because the data path for the rate of rotation signal should be operated without interruption in order to allow for efficient filtering of noise and interference due to external influences (such as vibrations). According to an example embodiment of the present invention, it is advantageously possible to operate at least part of the quadrature circuit means in at least one other operating mode than the rate of rotation circuit means, independently of the operating mode of the rate of rotation circuit means. In an advantageous manner, the offset changes in the rate of rotation signal caused by quadrature influences and/or temperature influences often occur at a lower frequency than the output of the rate of rotation signal. According to the present invention, it is therefore possible to save current by operating at least part of the quadrature circuit means in a different operating mode without any (real) negative effect on the signal quality of the rate of rotation signal.

Advantageous embodiments and refinements of the present invention are able to be gathered from the disclosure herein including the description with reference to the figures.

Because according to one embodiment of the present invention the rate of rotation circuit means include a demodulation device and/or an analog-to-digital converter as components of the acquisition circuit, and/or at least one digital filter as a component of the digital processing circuit, it is possible to achieve a particularly advantageous signal quality for the rate of rotation signal. In the operating mode of the rate of rotation circuit means, the rate of rotation signal is preferably able to be generated, digitized and filtered with the aid of the demodulation device, the analog-to-digital converter and the digital filter in order to achieve an advantageous signal quality and in particular a low noise level.

According to one example embodiment of the present invention, because the quadrature circuit means includes a demodulation device and/or an analog-to-digital converter as components of the acquisition circuit, and/or at least one digital filter as a component of the digital processing circuit, it is possible to achieve an advantageous generation and use of a quadrature signal for correcting an offset of the rate of rotation signal. In a particularly advantageous manner, it is possible that the quadrature signal and the compensation signal for the correction of the rate of rotation signal are generated and/or updated at a relatively low data rate so that current is able to be saved. Because the offset drift of the rate of rotation signal, corrected with the aid of the quadrature signal, often changes more slowly than the output of the rate of rotation signal by the sensor system, these current savings are able to be achieved in a multitude of applications without any ill effect on the quality of the offset compensation of the rate of rotation signal. In particular, it is possible that a few or all of the following quadrature circuit means are operated in a different operating mode than the rate of rotation circuit means, namely the demodulation device for generating the quadrature signal, the analog-to-digital converter for digitizing the quadrature signal, and/or the at least one digital filter for filtering the digitized quadrature signal.

Because the sensor system according to an example embodiment of the present invention includes a temperature sensor for acquiring a temperature signal, and temperature circuit means (i.e., temperature circuit) for processing the temperature signal and for generating the compensation signal, the digital processing circuit being configured to generate the compensation signal on the basis of the digitized quadrature signal and the digitized temperature signal, characterized in that at least part of the temperature circuit means is operable in at least one other operating mode than the rate of rotation circuit means, independently of the operating mode of the rate of rotation circuit means, it is possible to reduce the current consumption of the sensor system in a particularly advantageous manner. Often the temperature changes much more slowly than the sensor system outputs the rate of rotation signal so that a high-frequency generation of the temperature signal provides no advantage, or at best, only a negligible advantage, for the signal quality of the rate of rotation signal, but significantly increases the current consumption. Because at least part of the temperature circuit means is operated in a different operating mode than the rate of rotation circuit means, it is therefore possible to save energy without reducing the signal quality.

Because the temperature circuit means according to one embodiment of the present invention include an analog-to-digital converter and/or at least one digital filter and/or at least one adder and/or multiplier, it is possible to generate an advantageous compensation signal with the aid of a temperature signal but still save current by operating at least part of the temperature circuit means in a different operating mode than the rate of rotation circuit means. In particular, it is possible that a few or all of the following temperature circuit means are operated in the different operating mode than the rate of rotation circuit means, namely:

the temperature sensor,
the analog-to-digital converter,
the at least one digital filter,
the at least one adder, and/or
the at least one multiplier.

According to an example embodiment of the present invention, since the sensor system includes an operating mode control device for specifying the instantaneous operating modes for the rate of rotation circuit means and/or for the quadrature circuit means and/or the temperature circuit means, it is possible to adjust different operating modes for the rate of rotation circuit means and/or for the quadrature circuit means and/or for the temperature circuit means, so that a desired signal quality is achievable yet current is able to be saved nevertheless. The operating mode control device is preferably responsible for the actuation of the individual switching components of the rate of rotation circuit means, the quadrature circuit means and/or the temperature circuit means in accordance with the respective operating mode and/or is configured to adjust the switching components of the rate of rotation circuit means, the quadrature circuit means and/or the temperature circuit means in accordance with the respective operating mode. The operating mode control device preferably also enables a switchover between different operating modes. It is possible, for instance, that the quadrature circuit means and/or the temperature circuit means are optionally operable in different energy saving modes, e.g., in duty cycling modes, which differ from one another by the duration of the time intervals of the activation and deactivation of the switching components of the quadrature circuit means and/or the temperature circuit means and are able to be configured, selected and/or adjusted with the aid of the operating mode control device.

Another subject matter of the present invention is a method for operating a sensor system according to an embodiment of the present invention. In accordance with an example embodiment of the present invention, in the method, the rate of rotation circuit means are operated in a measuring mode in which the rate of rotation signal is supplied at a first data rate, and the quadrature circuit means are operated in a first energy saving mode in which the quadrature signal is supplied at a second data rate, the second data rate being lower than the first data rate.

In this way, the rate of rotation signal is advantageously able to be generated and/or output at a higher frequency than the generation or updating of the quadrature signal and/or the compensation signal takes place. In many cases, the offset of the rate of rotation signal by quadrature influences changes more slowly than the generation and output of the rate of rotation signal is realized. As a result, it is possible to save energy by operating the quadrature circuit means in a first energy saving mode without any (real) negative effect on the quality of the offset compensation.

Since according to an embodiment of the present invention, especially according to an embodiment of the present method, at least parts of the quadrature circuit means are cyclically activated and deactivated at predefined time intervals in the first energy saving mode, it is possible to save current in the first energy saving mode during the operation of the quadrature circuit means.

Because according to an embodiment of the present invention, especially according to an embodiment of the present method, the sensor system includes at least one temperature sensor and temperature circuit means, characterized in that the temperature circuit means are operated in a second energy saving mode in which the temperature signal is provided at a data rate that is lower than the first data rate, energy is able to be saved in the operation of the temperature circuit means. It is also possible to operate the temperature sensor in the second energy saving mode.

According to an example embodiment of the present invention, especially according to an example embodiment of the present method of the present invention, particularly advantageous current savings are possible since the quadrature circuit means and the temperature circuit means are operated in the same energy saving mode, so that the quadrature signal and the temperature signal are supplied at the same data rate. The compensation signal may preferably be updated and/or generated at the same data rate as the quadrature signal and the temperature signal.

The advantages and embodiments described above in connection with the sensor system according to the present invention or in connection with an embodiment of the sensor system according to the present invention are able to be used for the method for operating a sensor system. For the sensor system, the advantages and embodiments that are described above in connection with the method for operating a sensor system according to the present invention or an embodiment of the method according to the present invention may be used.

An exemplary embodiment of the present invention is shown in the figures and described in greater detail below.

BRIEF DESCRIPTION OF THE DRAWING

FIG. 1 shows a schematic illustration of a sensor system according to an exemplary embodiment of the present invention.

DETAILED DESCRIPTION OF EXAMPLE EMBODIMENTS

Sensor system 100 according to the exemplary embodiment of FIG. 1 has a MEMS gyroscope 1, which includes a seismic mass 21 that is able to be excited to oscillations. Illustrated MEMS gyroscope 1 is a triaxial gyroscope which in addition to mass 21, has two further masses 21', 21". Masses 21, 21', 21" are developed to detect rates of rotation about independent axes in each case. Seismic masses 21, 21', 21", for instance, are able to be driven via a shared drive circuit 10 and drive means (i.e., drive) 11 of sensor system 100.

Below, sensor system 100 for mass 21 and the signal acquisition and signal processing are described with regard to this mass 21. However, corresponding acquisition circuits and digital processing circuits are able to be set up for further masses 21', 21", each including corresponding rate of rotation circuit means, quadrature circuit means and temperature circuit means, as the case may be.

Drive circuit 10 is configured to excite and maintain a defined oscillating motion of seismic mass 21. The drive circuit includes a C/V converter 12 with whose aid the drive motion of the drive mass is detected in order to obtain information pertaining to the oscillation amplitude. This information pertaining to the oscillation amplitude is made available to an amplitude regulator 14 (amplitude gain controller AGC) with whose aid the mass is driven via corresponding means 11, in such a way that a constant amplitude of the mass oscillation is obtained. In addition, drive circuit 10 includes a phase-locked loop (PLL) 13, which ascertains the frequency and phase of the mass oscillation and supplies the corresponding information with regard to the frequency and phase for amplitude gain controller 14 as well as for the I/Q demodulation to acquisition circuit 20. To this end, phase-locked loop 13 supplies to demodulation device 30 of acquisition circuit 20 a corresponding signal for generating rate of rotation signal 210 from measuring signal 200, and to demodulation device 41 a corresponding phase-shifted signal for generating quadrature signal 211 from measuring signal 200. The Q-demodulation with regard to quadrature signal 211 has the same phase as the demodulation of amplitude gain controller 14, and the I-demodulation with regard to rate of rotation signal 210 is phase-shifted by 90° thereto.

For the detection and further processing of a measuring signal 200, sensor system 100 includes an analog acquisition circuit 20 and a digital processing circuit 50. Measuring signal 200 of the detection channel of mass 21 is generated or supplied by a C/V converter 22 in acquisition circuit 20. Measuring signal 200 includes rate of rotation information pertaining to a detected rate of rotation, which is based on the Coriolis force. This rate of rotation information is obtained from measuring signal 200 by rate of rotation circuit means 30, 31, 32 and further processed. For this purpose, rate of rotation circuit means 30, 31, 32 include not only demodulation device 30, which is set up to generate rate of rotation signal 210 from measuring signal 200, but also an analog-to-digital converter 31, which is set up to digitize rate of rotation signal 210, and also at least one digital filter 32 which filters the digitized rate of rotation signal. Furthermore, quadrature circuit means 41, 42, 43 are provided, which are configured to generate and further process a quadrature signal 211 from measuring signal 200. In addition to demodulation device 41, which is set up to generate quadrature signal 211 from measuring signal 200, quadrature circuit means 41, 42, 43 encompass an analog-to-digital converter 42, which is configured to digitize quadrature signal 211, and a digital filter 43, which is set up to filter the digitized quadrature signal. Quadrature signal 211 includes information pertaining to quadrature effects that are produced by mechanical shortcomings or errors and are included in the measuring signal of the gyroscope. After the digitization and filtering, the quadrature signal is therefore able to be used in digital processing circuit 50 for correcting an offset of rate of rotation signal 210 induced by quadrature effects.

In addition, the sensor system includes temperature circuit means 61, 62, 63, 63', 63". Temperature sensor 60 is configured for carrying out a temperature measurement. With the aid of an analog-to-digital converter 61, a temperature signal from temperature sensor 60 is digitized and filtered by a digital filter 62. The filtered temperature signal obtained in this way is able to be weighted with the aid of at least one adder 63' and a multiplier or a plurality of multipliers 63, 63" using coefficients C0, C1 and combined with the digitized and filtered quadrature signal in order to supply a compensation signal 212 for an offset compensation of the rate of rotation signal.

For the further discussion, the quadrature circuit means and temperature circuit means 41, 42, 43, 60, 61, 62, 63, 63', 63" of sensor system 100 are emphasized in FIG. 1 by a common box 40 for illustration purposes.

According to the present invention, it is advantageously possible to operate at least part of the quadrature circuit means and/or temperature circuit means 40 in at least one other operating mode than rate of rotation circuit means 30, 31, 32, independently of the operating mode of rate of rotation circuit means 30, 31, 32. The quadrature circuit means and/or temperature circuit means 40 preferably represent a power domain or a plurality of power domains, set up independently of rate of rotation circuit means 30, 31, 32, so that they are able to be operated in one or more other operating mode(s) independently of rate of rotation circuit means 30, 31, 32. It is therefore possible that at least part of the quadrature circuit means and/or temperature circuit means 40 is cyclically changed over time in their power consumption (power duty cycle) without rate of rotation circuit means 30, 31, 32 adopting this cycle as well. It is possible that at least part of quadrature circuit means 41, 42, 43 and/or temperature circuit means 61, 62, 63, 63', 63" is/are operated in one or more operating mode(s) in which they have a lower power consumption than they would in the operating mode in which rate of rotation circuit means 30, 31, 32 are located. Since the offset of the rate of rotation signal induced by quadrature effects and the prevailing temperature change considerably slower in a multitude of applications than the rate at which the rate of rotation signal is generated and output, quadrature circuit means and/or temperature circuit means 40 are advantageously able to be operated in an operating mode in which compensation signal 212 is updated at a lower data rate than the rate at which the rate of rotation signal is output, without any significant worsening coming about in the quality of the rate of rotation signal output by sensor system 100. Due to this lower updating rate of compensation signal 212 it is possible to activate or deactivate the quadrature circuit means and/or temperature circuit means 40 at least partly or also completely in a cyclical manner, which provides current savings.

It is possible to operate rate of rotation circuit means 30, 31, 32 in a measuring mode in which the rate of rotation signal is supplied at a first data rate, and to operate quadrature circuit means 41, 42, 43 in a first energy saving mode in which the quadrature signal is provided at a second data rate, the second data rate being lower than the first data rate. At least parts of quadrature circuit means 41, 42, 43 are able to be cyclically activated and deactivated at predefined time intervals in the first energy saving mode (duty cycling), so that the current consumption is reduced in comparison to a continuous-running operation of quadrature circuit means 41, 42, 43.

It is possible to operate temperature circuit means 61, 62, 63, 63', 63" and/or temperature sensor 60 in a second energy saving mode in which the temperature signal is supplied at a data rate that is lower than the first data rate at which the rate of rotation signal is provided in the measuring mode. In a particularly advantageous manner, it is possible that the data rates of the first and second energy saving modes are identical and compensation signal 212 is updated at the data rate of the first and second energy saving mode in an especially preferred manner. However, the data rate of the second energy saving mode may alternatively also differ from the data rate of the first energy saving mode.

For example, it is possible that the quadrature circuit means and/or temperature circuit means 40 are (all or partly) activated and supplied with energy for a few milliseconds in order to generate an offset compensation value, and that the quadrature circuit means and/or temperature circuit means 40 are then switched off completely or partly. This activation and deactivation, and thus the generation of an offset compensation value, may be repeated at a rate of 1 Hz, for instance. Rate of rotation circuit means 30, 31, 32, on the other hand, are in a measuring mode in which they are supplied with energy without interruption (and thus are activated without interruption), for example, and output a rate of rotation signal at a data rate of 500 Hz, for instance.

Sensor system 100 may furthermore encompass an operating mode control device for specifying the instantaneous operating mode for rate of rotation circuit means 30, 31, 32 and/or for quadrature circuit means 41, 42, 43 and/or for temperature circuit means 61, 62, 63, 63', 63". It is possible that the operating mode control device may allow for a switch between different operating modes. For instance, different energy saving modes having different data rates are able to be adjusted for quadrature circuit means 41, 42, 43 and/or for temperature circuit means 61, 62, 63, 63', 63", and a switch between these different energy saving modes may be made with the aid of the operating mode control device. It is also possible that quadrature circuit means 41, 42, 43 and/or temperature circuit means 61, 62, 63, 63', 63" are at least partly put into an operating mode that has the same data rate as the measuring mode of rate of rotation circuit means 30, 31, 32 with the aid of the operating mode control device.

For instance, it is possible that the operating modes for rate of rotation circuit means 30, 31, 32 and/or for quadrature circuit means 41, 42, 43 and/or for temperature circuit means 61, 62, 63, 63', 63" are able to be adjusted by a user with the aid of the operating mode control device. This makes it possible to carry out an especially advantageous adaptation to certain application conditions and requirements.

What is claimed is:

1. A sensor system having a MEMS gyroscope, the sensor system comprising:
    a seismic mass that is able to be excited to oscillations for acquiring a measuring signal;
    a drive circuit configured to excite and maintain a defined oscillating motion of the seismic mass;
    an acquisition circuit configured to read out the measuring signal and to demodulate the measuring signal, whereby a rate of rotation signal and a quadrature signal phase-shifted relative to the rate of rotation signal are generated; and
    a digital processing circuit configured to compensate an offset of a digitized rate of rotation signal using a digitized quadrature signal;
    wherein the acquisition circuit and the digital processing circuit encompass a rate of rotation circuit configured to generate and process the rate of rotation signal, and a quadrature circuit configured to generate and process the quadrature signal and to generate a compensation signal for the offset compensation of the digitized rate of rotation signal; and
    wherein at least part of the quadrature circuit is operable in at least one other operating mode than the rate of rotation circuit, independently of the operating mode of the rate of rotation circuit,
    wherein the rate of rotation circuit is configured to be operated in a measuring mode in which the rate of rotation signal is supplied at a first data rate; and
    wherein the quadrature circuit is configured to be operated in a first energy saving mode in which the quadrature signal is supplied at a second data rate, the second data rate being lower than the first data rate.

2. The sensor system as recited in claim 1, wherein the rate of rotation circuit encompasses: (i) a demodulation device and/or an analog-to-digital converter as components of the acquisition circuit, and/or (ii) at least one digital filter as a component of the digital processing circuit.

3. The sensor system as recited in claim 1, wherein the quadrature circuit encompasses: (i) a demodulation device and/or an analog-to-digital converter as components of the acquisition circuit, and/or (ii) at least one digital filter as a component of the digital processing circuit.

4. The sensor system as recited in claim 1, further comprising:
    at least one temperature sensor configured to acquire a temperature signal; and
    a temperature circuit configured to process the temperature signal and to generate the compensation signal, the digital processing circuit being configured to generate the compensation signal based on the digitized quadrature signal and the digitized temperature signal, wherein at least part of the temperature circuit is able to be operated in at least one other operating mode than the rate of rotation circuit, independently of the operating mode of the rate of rotation circuit means.

5. The sensor system as recited in claim 4, wherein the temperature circuit includes an analog-to-digital converter and/or at least one digital filter and/or at least one adder and/or multiplier.

6. The sensor system as recited in claim 4, further comprising:
    an operating mode control device configured to specify instantaneous operating modes for the rate of rotation circuit and/or for the quadrature circuit and/or for the temperature circuit.

7. A method for operating a sensor system, the sensor system having a MEMS gyroscope and includes a seismic mass that is able to be excited to oscillations for acquiring a measuring signal, a drive circuit configured to excite and maintain a defined oscillating motion of the seismic mass, an acquisition circuit configured to read out the measuring signal and to demodulate the measuring signal, whereby a rate of rotation signal and a quadrature signal phase-shifted relative to the rate of rotation signal are generated, and a digital processing circuit configured to compensate an offset of a digitized rate of rotation signal using a digitized quadrature signal, wherein the acquisition circuit and the digital processing circuit encompassing rate of rotation circuit configured to generate and process the rate of rotation signal, and a quadrature circuit configured to generate and process the quadrature signal and to generate a compensation signal for the offset compensation of the digitized rate of rotation signal, and wherein at least part of the quadrature circuit is operable in at least one other operating mode than the rate of rotation circuit, independently of the operating mode of the rate of rotation circuit, wherein the method comprises:

operating the rate of rotation circuit in a measuring mode in which the rate of rotation signal is supplied at a first data rate; and operating the quadrature circuit in a first energy saving mode in which the quadrature signal is supplied at a second data rate, the second data rate being lower than the first data rate.

8. The method as recited in claim 7, wherein in the first energy saving mode, at least parts of the quadrature circuit are cyclically activated and deactivated at predefined time intervals.

9. The method as recited in claim 7, wherein the sensor system includes at least one temperature sensor a temperature circuit, wherein the temperature circuit is operated in a second energy saving mode in which a temperature signal is supplied at a data rate that is lower than the first data rate.

10. The method as recited in claim 9, wherein the quadrature circuit and the temperature circuit are operated in the same energy saving mode so that the quadrature signal and the temperature signal are supplied at the same data rate.

* * * * *